United States Patent [19]
McPherson

[11] Patent Number: 5,943,807
[45] Date of Patent: Aug. 31, 1999

[54] FOLDING LARGE GAME DECOY

[76] Inventor: Jerry McPherson, P.O. Box 2377, Colstrip, Mont. 59323

[21] Appl. No.: 08/961,897

[22] Filed: Oct. 31, 1997

Related U.S. Application Data

[60] Provisional application No. 60/029,920, Nov. 1, 1996.

[51] Int. Cl.$^6$ .................................................. A01M 31/06
[52] U.S. Cl. ........................................................... 43/2
[58] Field of Search ................................................ 43/2, 3

[56] References Cited

U.S. PATENT DOCUMENTS

| | | | |
|---|---|---|---|
| 1,598,619 | 9/1926 | Reynolds | 43/3 |
| 2,237,897 | 4/1941 | Vos | 43/2 X |
| 2,252,262 | 8/1941 | Keays | 43/3 |
| 2,799,961 | 7/1957 | Jaumotte | 43/3 |
| 4,590,699 | 5/1986 | Nicks | 43/2 |
| 4,689,913 | 9/1987 | Brice | 43/3 |
| 4,723,371 | 2/1988 | Williams | 43/1 |
| 4,829,694 | 5/1989 | Oasheim | 43/2 X |
| 4,852,288 | 8/1989 | Payne et al. | 43/2 |
| 5,522,168 | 6/1996 | Friddle | 43/2 X |
| 5,546,692 | 8/1996 | Byers | 43/2 |
| 5,572,823 | 11/1996 | Savaria | 43/2 |
| 5,632,110 | 5/1997 | Roy | 43/2 |

*Primary Examiner*—Robert P. Swiatek
*Attorney, Agent, or Firm*—Richard C. Conover

[57] ABSTRACT

A large game decoy, including two pieces of fabric material, cut into the shape of a side-silhouette of a big game animal. The two pieces of fabric are sewn together along the periphery of the silhouette to form a pocket. A continuous band of spring steel is formed in a loop and inserted in the pocket. The band being sized to expand to at least a portion of the periphery of the silhouette stretching the fabric material to form a semi-rigid shape of this portion of the silhouette. A collapsible pole is inserted in the pocket to provide an elongate shape to the cut-out silhouette, and further collapsible poles are used to shape the legs of the decoy. These leg poles extend away from the silhouette and are used to stake the decoy into the ground. The decoy may be collapsed by using a technique known as "twist-fold" to twist and fold the continuous band of spring steel to collapse the body into a small compact package.

5 Claims, 3 Drawing Sheets

FOLDING LARGE GAME DECOY

This application claims benefit of provisional application 60/029920 filed Nov. 1, 1996.

BACKGROUND

Big game hunters often need light-weight, fold-up decoys so that several of them can be carried to a hunting site and set-up to attract big game. Large game decoys are known. See for example U.S. Pat. No. 4,852,288 to Payne et al.; U.S. Pat. No. 5,522,168 to Friddle; U.S. Pat. No. 5,546,692 to Byers; and U.S. Pat. 5,632,110 to Roy.

None of these large game decoys, however, permit a user to fold the decoy up into a small, lightweight bundle for ease in carrying to and from a hunting area.

From the above, it can be seen that what is needed is a lightweight, collapsible, big game decoy that can be easily transported and set up in a hunting area. When not in use, the decoy should be collapsible into a much smaller area than the big game animal it represents.

SUMMARY OF INVENTION

The present invention relates to a large game decoy. The decoy includes two pieces of fabric material cut into the shape of a side-silhouette of a big game animal. A continuous loop formed from a band of spring steel is inserted in the pocket. The loop being sized to expand to at least a portion of the silhouette stretching the fabric material within the loop to form a semi-rigid shape of a portion of the silhouette.

Collapsible poles are also inserted in the pocket to provide elongate shape to the cut-out silhouette and further collapsible poles are used to shape the legs of the decoy. These leg poles extend away from the silhouette and are used to stake the decoy into the ground.

The decoy may be collapsed into a small compact bundle by removing and collapsing the collapsible poles and then using a technique known as "twist/fold" to twist and fold the continuous band of spring steel to collapse the body into a small compact package.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

To understand folding decoy 10, it is necessary to understand the "twist/fold" technique that has been used conventionally in other items such as sun shades for car windows and band saw blades. This technique is shown schematically in FIG. 1.

Figure 1:
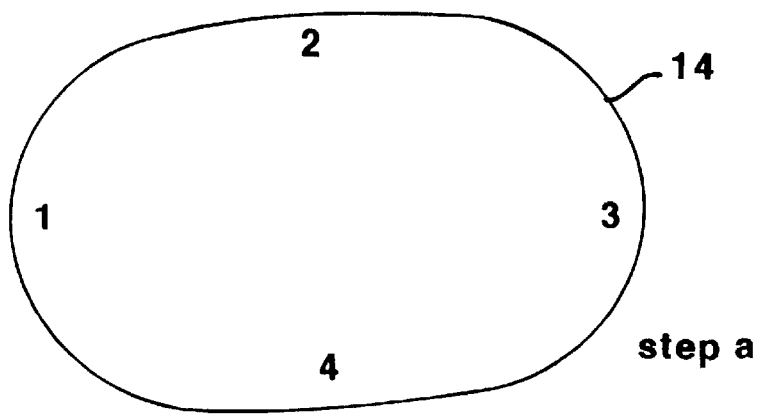
FIG. 1 is a schematic of several steps used in performing a "twist-fold"
Figure 1:
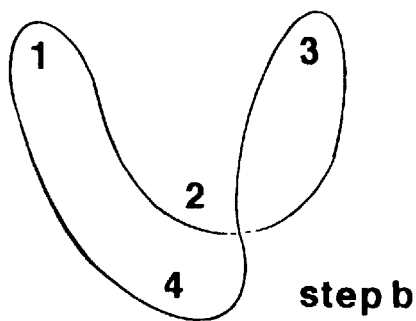
Figure 1:
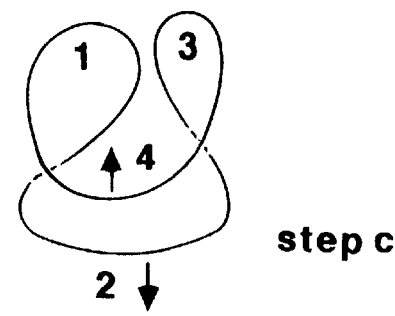
Figure 1:
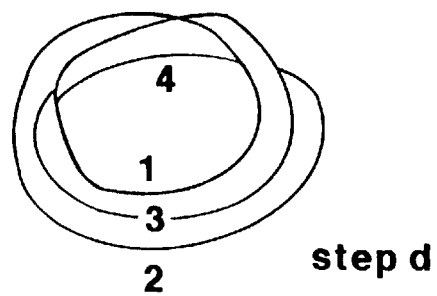

A loop formed from a band of spring steel band 14 is shown in step "a" in an expanded condition. For purposes of explanation, band 14 has segments labeled 1, 2, 3, and 4 as shown in FIG. 1.

To start the twist/fold, segments 1 and 3 are raised toward each other, (a person grasps steel band 14 adjacent segments 1 and 3 with his two hands) while segments 2 and 4 drop, as shown in step "b". A saddle shape is thus formed with segments 1 and 3 extending upwardly, and segments 2 and 4 extending downwardly.

In step c, segment 1 is twisted toward the user and segment is twisted away from the user. When this is done, the band 14 collapses into 3 rings overlying one another as shown in step "d".

Figure 2:
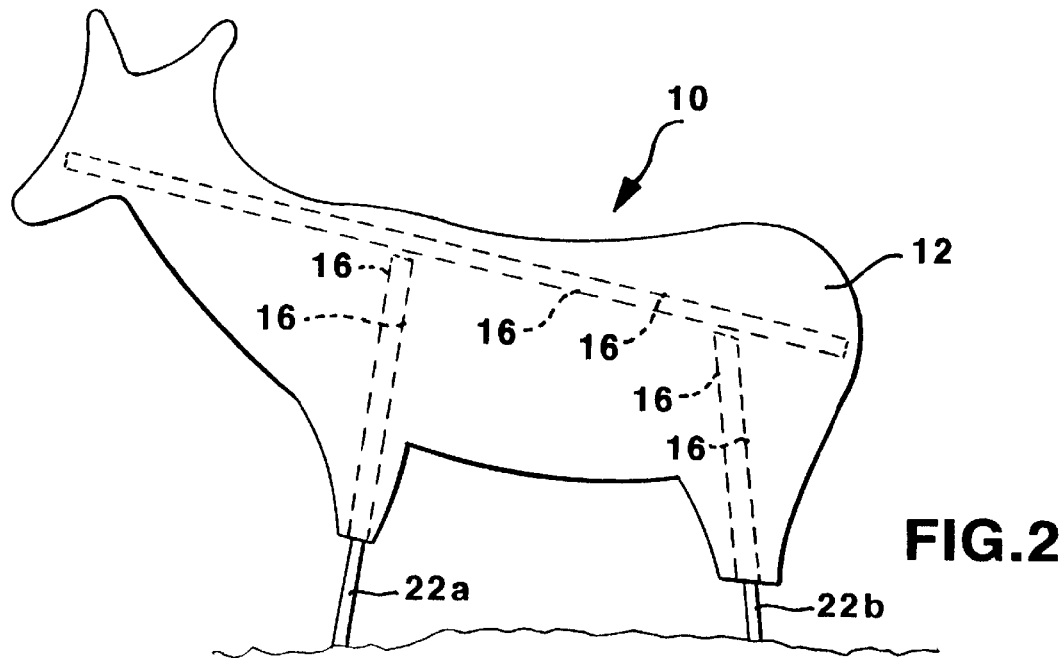
FIG. 2 is an elevational view of a folding decoy according to the present invention.
Figure 3:
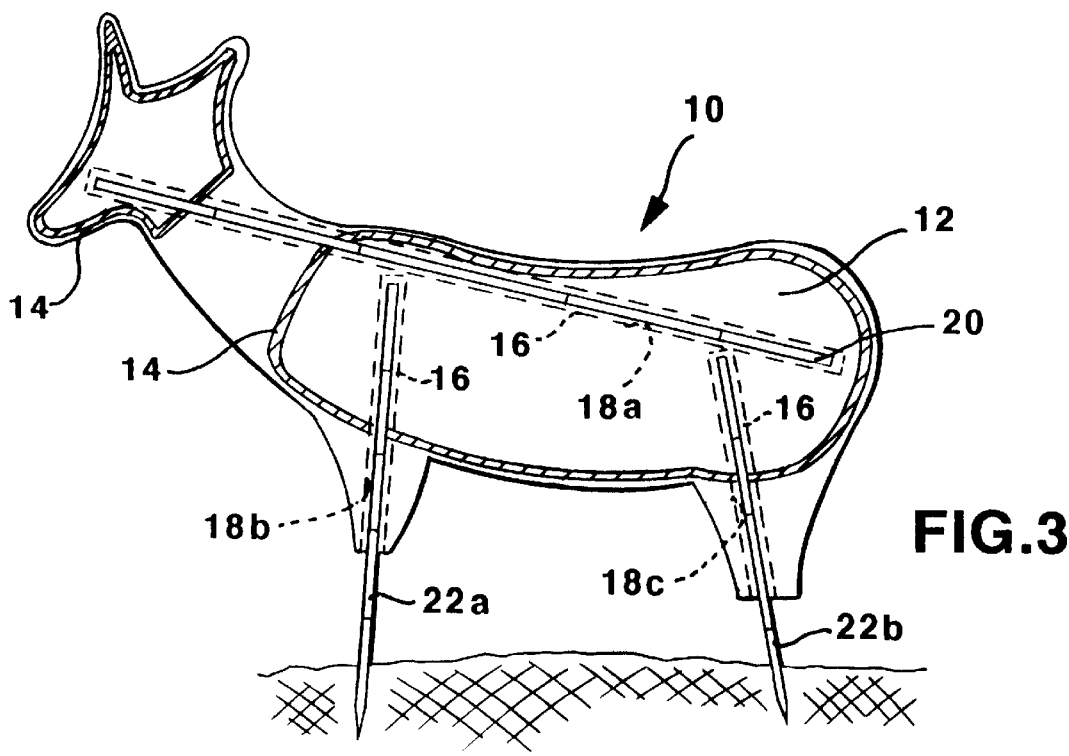
FIG. 3 is an elevational view of the folding decoy shown in FIG. 2 with one side of the fabric pocket removed.

A preferred embodiment of the present invention is shown in FIGS. 2 and 3. Two identical pieces of fabric material 12 are cut-out in a general shape of the game sought to be decoyed. The two pieces of fabric are sewn together around the peripheral edges to form a pocket having the silhouette shape. This material 12 is further colored and painted (not shown) on both front and back sides to provide more realism to the decoy. A twist-fold band 14, as described with reference to FIG. 1, is inserted in the pocket thus formed and is sized to expand to the peripheral edges of the pocket as shown in FIG. 3. The fabric material is thus stretched by the band 14 to provide a semi-rigid shape of a portion of the silhouette. As shown in FIG. 3, one twist-fold band 14 is used to provide shape to the body of the silhouette and another separate band 14 is used to provide shape to the head of the silhouette.

The fabric silhouette is further sewn with stitching 16 through both pieces of fabric 12 to form, in a preferred embodiment, channels labeled 18a, 18b and 18c.

Collapsible pole 20 is inserted in channel 18a through a slot (not shown) in the fabric as shown in FIG. 3 to provide elongate shape to the decoy 10. In a preferred embodiment, pole 16 is a conventional tent pole having elastic joining a number of pole segments. Tent poles are used because they are easily collapsed.

A pair of collapsible leg poles 22a and 22b are inserted in open ended channels 18b and 18c respectively. The channel 18b is positioned adjacent to the front leg as shown in FIG. 3 and channel 18c is positioned adjacent to the rear leg as shown in FIG. 3. The leg poles 22a and 22b extend away from the body of decoy 10, and at the distal end thereof are pointed for easy insertion into the ground, as shown in FIG. 2.

Figure 4:
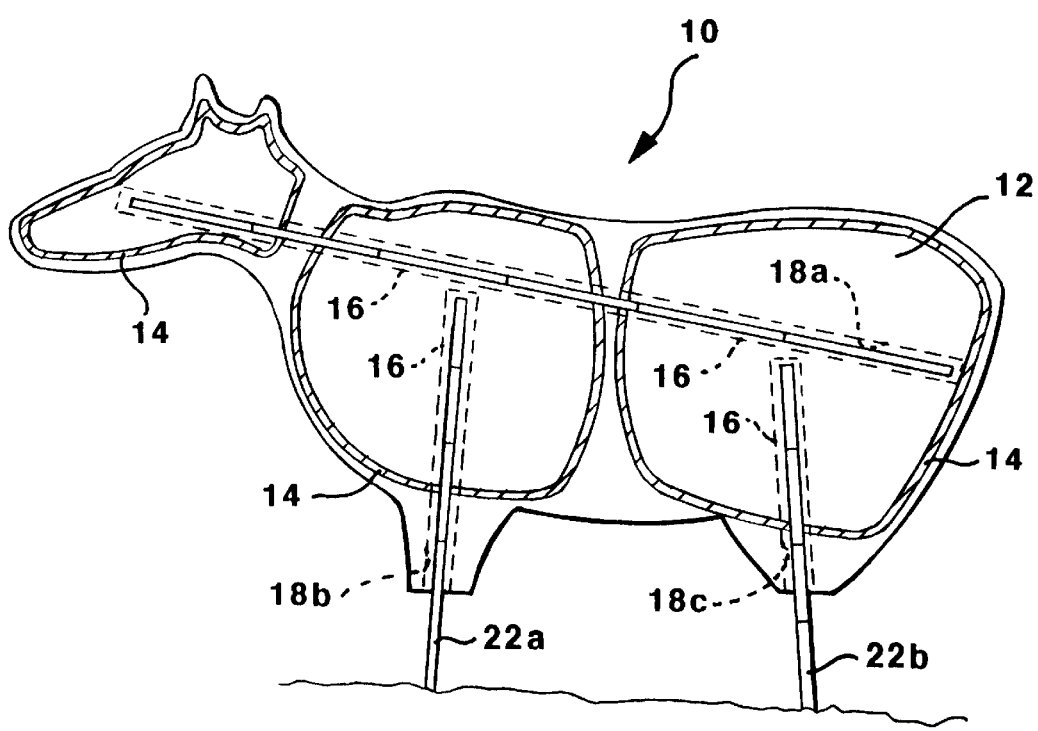
FIG. 4 is an elevational view of a second embodiment of a folding decoy according to the present invention with one side of the fabric pocket removed.

FIG. 4 shows another embodiment of the present invention. In this embodiment, additional loops of spring steel bands 14 are provided to shape larger animals and to provide other specific shapes, such as the shape of a head, which are unique to the particular animal being decoyed. The structure, however, is the same as shown in FIG. 3 and the element numbers in FIG. 4 correspond to the same element numbers used in FIG. 3.

Further it is recognized that this twist-fold structure described herein could be used with animals other than the ones shown here and could be used to decoy birds as well if the fabric material were shaped to conform to the bird being decoyed.

In operation, the decoy is set-up by removing the decoy 10 from a carrying container and allowing the twist-fold band 14 to expand from a folded condition to its normal unfolded state. A portion of the silhouette is thus formed in a semi-rigid state. The pole 20 is assembled in a conventional manner using the elastic joining adjacent segments. The pole 20 is then inserted into channel 18a. Leg poles 22a and 22b are assembled and inserted in channels 18b and 18c, respectively. The pointed ends of leg poles 22a and 22b are then driven into the ground at the desired site.

When the folding decoy 10 is to be packed away, leg poles 22a and 22b are removed from the ground. These poles are then withdrawn from channels 18b and 18c and collapsed in a conventional manner. Next pole 20 is removed from channel 18a and collapsed in a conventional manner.

A "twist/fold" is accomplished on spring steel bands 14 to reduce their size. The remarkable aspect of the "twist/fold" is that the material contained within the circumference of spring steel band 14 is only twisted, and not punctured, as the area is collapsed to approximately ⅓ of its original planar area. Material 12, and poles 20 and 22a and 22b are then placed in an appropriate container awaiting the next use of the folding decoy.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A folding decoy comprising:
   a fabric material cut out in a silhouette shape of an animal to be decoyed; and
   a continuous loop formed from a band of spring steel fastened to one side of the material, the loop acting as a spring and sized to stretch the fabric inside the loop for the purpose of semi-rigidly shaping the cut-out material to form a portion of the silhouette, whereby the loop is collapsed by twisting and folding the loop on itself.

2. The folding decoy according to claim 1 further including a supporting pole means connected to the cut-out material for supporting the silhouette above a ground surface when the supporting pole means has one end driven into the ground.

3. The folding decoy according to claim 2 further including a shaping pole means secured to the cut-out material to provide an elongate shape to the silhouette.

4. The folding decoy according to claim 3 wherein the shaping pole means is constructed of collapsible segments.

5. The folding decoy according to claim 4 wherein the segments of each of the supporting pole means and shaping pole means are connected together, respectively, with an elastic cord.

* * * * *